United States Patent
Shuck et al.

(10) Patent No.: US 12,038,086 B2
(45) Date of Patent: Jul. 16, 2024

(54) MOVEABLE SEAL POINT PACKING SYSTEM

(71) Applicant: SPM Oil & Gas Inc., Fort Worth, TX (US)

(72) Inventors: Charles Benjamin Shuck, Azle, TX (US); Connor James Docherty, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 147 days.

(21) Appl. No.: 17/619,214

(22) PCT Filed: Jun. 18, 2020

(86) PCT No.: PCT/US2020/038390
§ 371 (c)(1),
(2) Date: Dec. 14, 2021

(87) PCT Pub. No.: WO2020/257426
PCT Pub. Date: Dec. 24, 2020

(65) Prior Publication Data
US 2022/0243820 A1    Aug. 4, 2022

Related U.S. Application Data

(60) Provisional application No. 62/863,476, filed on Jun. 19, 2019.

(51) Int. Cl.
*F16J 15/18* (2006.01)
(52) U.S. Cl.
CPC ............ *F16J 15/183* (2013.01); *F16J 15/181* (2013.01)

(58) Field of Classification Search
CPC .......... F16J 15/18; F16J 15/181; F16J 15/182; F16J 15/183; F16J 15/20; F04B 53/164
See application file for complete search history.

(56) References Cited

U.S. PATENT DOCUMENTS

| | | |
|---|---|---|
| 3,011,808 A | 12/1961 | Tucker et al. |
| 3,907,307 A | 9/1975 | Maurer et al. |
| 4,021,049 A | 5/1977 | Phelps et al. |
| 4,440,404 A * | 4/1984 | Roach ................ F16J 15/166 277/584 |
| 4,572,519 A | 2/1986 | Cameron et al. |
| 9,127,577 B2 | 9/2015 | Donald |
| 2010/0143163 A1 | 6/2010 | Patel et al. |
| 2011/0239856 A1 | 10/2011 | Tiller et al. |
| 2017/0051738 A1* | 2/2017 | Horning .............. F04B 53/02 |
| 2019/0170137 A1* | 6/2019 | Chase ................ F04B 53/164 |
| 2022/0034402 A1* | 2/2022 | Kiani ................. F16J 15/187 |

OTHER PUBLICATIONS

International Search Report and Written Opinion on PCT/US2020/038390 dated Sep. 3, 2020.

* cited by examiner

*Primary Examiner* — Nicholas L Foster
(74) *Attorney, Agent, or Firm* — Foley & Lardner LLP

(57) ABSTRACT

A packing assembly providing a seal point configurable at multiple locations. The packing assembly includes a soft bed having at least one energizing ring and at least one seal ring. The assembly includes a spacer ring sealable with the at least one energizing ring. The assembly further includes at 1=least one adapter ring abutting either end of the soft bed to provide two seal locations relative to the spacer ring.

14 Claims, 9 Drawing Sheets

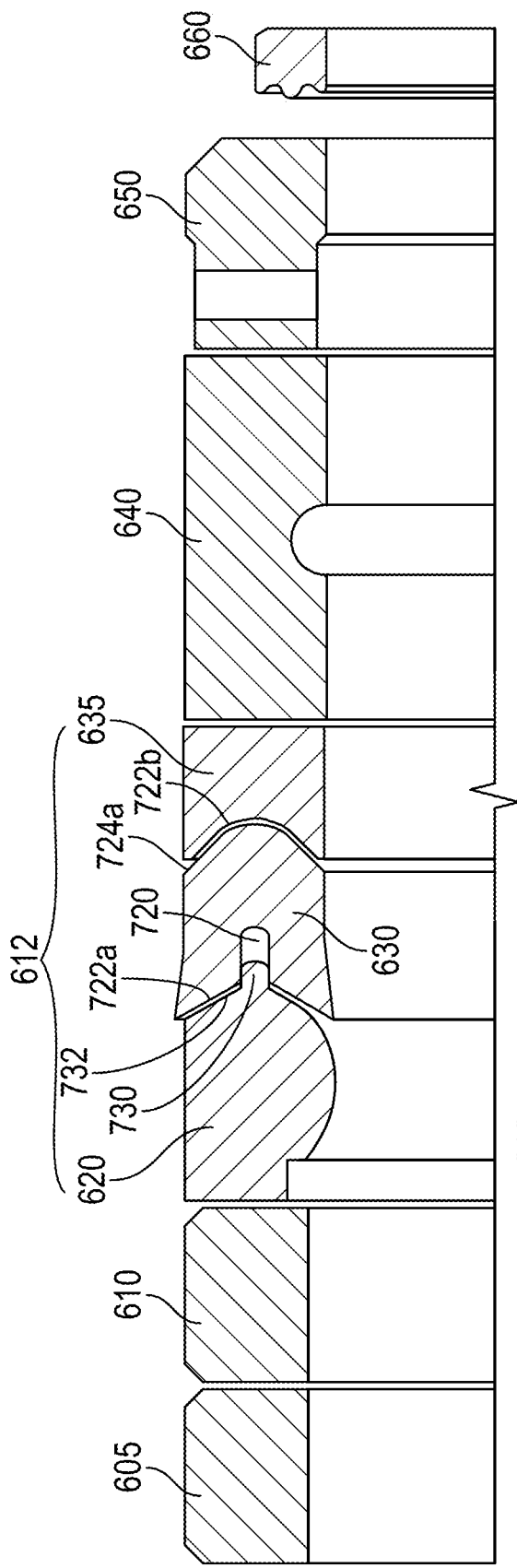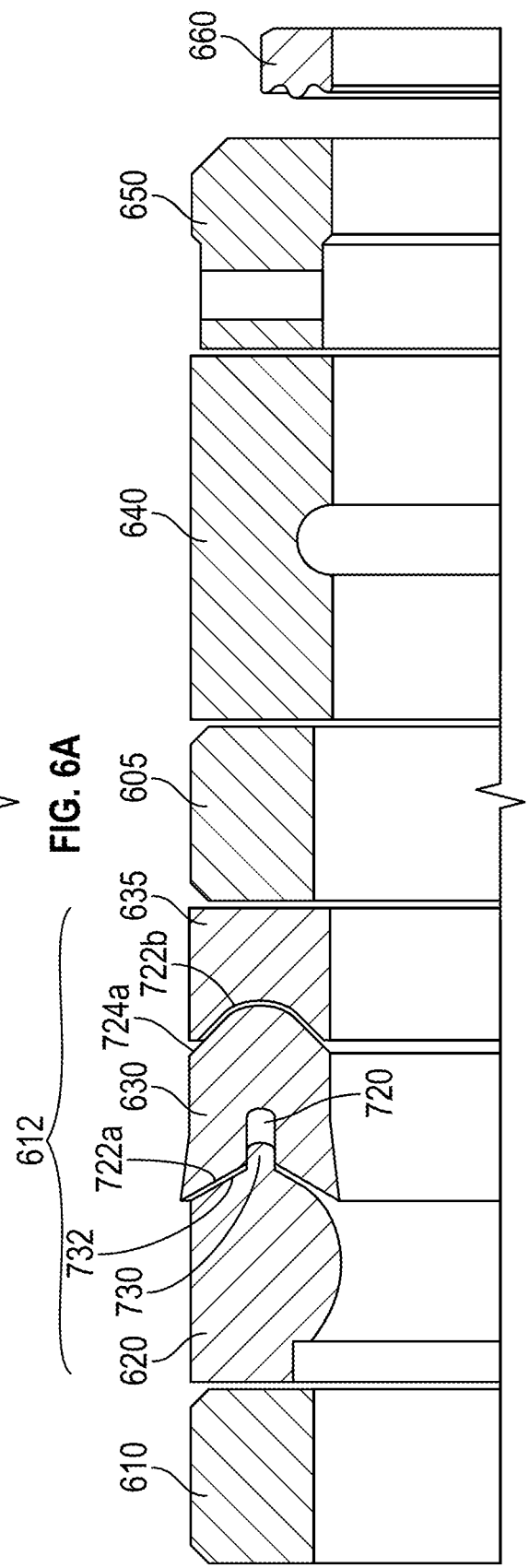

MOVEABLE SEAL POINT PACKING SYSTEM

CROSS-REFERENCE TO RELATED PATENT APPLICATIONS

This application is filed under 35 U.S.C. 371, and claims the benefit of and priority to PCT/US2020/038390, having a filing date of Jun. 18, 2020, entitled "MOVEABLE SEAL POINT PACKING SYSTEM," which claims the benefit of and priority to U.S. Provisional Patent Application No. 62/863,476, having a filing date of Jun. 19, 2019, entitled "MOVEABLE SEAL POINT PACKING SYSTEM," both of which are incorporated herein by reference in their entirety for all purposes.

TECHNICAL FIELD

The present disclosure relates generally to the field of pressure seals, and in particular, seals formed by packing assemblies.

BACKGROUND

During completion of an underground well, it is common to pump cement into the annulus formed between the wellbore casing and the subterranean surface. The cement, once set, can support and protect the wellbore casing from exterior corrosion and pressure changes. Reciprocating, linear, or other positive displacement pumps are often used to pump the cement due to their ability to produce the high pressures required and to handle the material qualities of the cement.

A positive displacement pump typically consists of a power end and a fluid end. The power end houses the crankshaft or gearbox that translates the mechanical power provided to the pump into pressurizing the fluid. The fluid end typically has an inlet and an outlet for the pumped fluid, with valves placed to ensure flow proceeds in the intended direction.

A reciprocating pump typically has three or five reciprocating elements, such as a plunger movable inside a cylinder. Connecting rods, each having a crankshaft end and a crosshead end, connect to the crankshaft at the crankshaft end. The crosshead end of the connecting rod is located in the cylinder and is connected to a crosshead so that the rotation of the crankshaft causes the plunger to reciprocatingly move into and out of the fluid end section in a back and forth motion. Linear pumps function in a similar manner with a plunger rod driven into and out of the fluid end by a gearbox to pump the fluid.

The plunger typically extends through a portion of the power end section and into a fluid end cylinder. A fluid end seal contained within the fluid end cylinder surrounds the plunger to prevent or limit fluid leakage into the power end housing. A power end seal contained within the power end section also surrounds the plunger or pony rod at or near an opposed end of the plunger to prevent or limit fluid contamination into the power end section. The fluid end seal and the power end seal may both include a packing assembly including a series of metal and non-metal components providing sealing abilities and structural integrity. The packing assembly includes a primary sealing location providing the sealing function and being the point of wear. When the sealing surfaces at the primary sealing location becomes worn out, the whole packing assembly needs be replaced or, alternatively, the fluid end will need to be repaired at substantial cost. Thus the lifespan of the packing assembly may be prematurely limited by the lifespan of the surfaces of the components at the sealing location.

Because the lifespan of the packing assembly is relatively short compared to other components of the pump, its failure could lead to undesired downtime of the pump and thus increased cost of operation. Other equipment may have sealing elements similar to the reciprocating pump and use a packing assembly for sealing, and are thus subject to similar undesired downtime due to the shorter lifespan of the sealing surfaces in the packing assembly.

Both the packing assembly and the fluid end are consumables during operation of the pump and a leading cause of pump downtime due to wear of the sealing surfaces. The risk of common packing or fluid end failure modes increases exponentially over time. Because of the risk involved with their failure, the packing assembly is changed out frequently, completely replaced with a brand new packing assembly. Following several replacements, the fluid end cylinder bore at the sealing location can become worn beyond acceptable limits, which may result in scrapping of the fluid end component or time consuming and costly weld repairs. There is a need to overcome these deficiencies.

SUMMARY OF THE INVENTION

The disclosed embodiments of a movable seal point packing assembly allow for the sealing components to be moved to multiple predesigned locations throughout the packing assembly, where the sealing components provide a new sealing surface. By moving the sealing point throughout the assembly, the movable seal point packing assembly increases subsequent life and reliability of the fluid end while at the same time, reducing operator downtown time.

In some embodiments, the components of the movable seal point packing assembly are made to allow for a seal ring to be indexed in the fluid cylinder bore while ensuring no overlap of sealing components or wear profiles, in order to maximize the lifespan of the movable seal point packing assembly. Some of the components may have flexibility to maneuver the non-metal sealing components throughout distinct locations in the packing assembly as needed. The disclosed packing assembly may be retrofitted into all currently available pumps that utilize a packing assembly sealing scheme.

In the first general embodiment, a packing assembly provides a seal point that is configurable at multiple locations. The packing assembly includes a soft bed having at least one energizing ring and at least one seal ring, a spacer ring that is sealable with one of the energizing rings, and at least one adapter ring abutting either end of the soft bed. By switching the location of the adapter ring, two seal locations relative to the spacer ring are provided.

In a specific embodiment, at least two seal rings are used in the packing assembly and each seal ring includes a concave receiving surface and a convex seating surface so that each seal ring is seatable into another. Additionally, at least one of the seal rings includes an expansion groove in the concave receiving surface so that a rib located on the energizing ring may be inserted into the seal ring that abuts the energizing ring, causing the seal ring to expand radially, increasing the sealing effect provided by the seal ring.

In still another embodiment, the energizing ring includes an energizing seating surface that is seatable onto the concave seating surface of one of the seal rings. A rib extends from the energizing seating surface and is inserted into the expansion groove of the seal ring that abuts the energizing ring expanding the seal ring in a radially direction and increasing the seal effect provided by the seal ring.

In another specific embodiment, at least one of the seal rings includes raised edges on the outer perimeter and on the inner perimeter of the seal ring forming a channel on the seal ring. A second energizing ring may be seated into the channel of the seal ring expanding the seal ring radially and increasing the seal effect provided by the seal ring.

In yet another embodiment, two or more seal rings are employed in the packing assembly. A first seal ring is seated radially onto a second seal ring, and the first ring is formed of a different material than the second seal ring.

In other embodiments, two or more rings are employed in the packing assembly and a first seal ring has a convex cross-section and a second seal ring having a concave cross section is seated onto the first seal ring, the two seal rings being formed of different materials.

In specific method embodiment, two or more rings are employed in the packing assembly and when one of the seal rings becomes worn out, the seal rings are packed together in different orders relative to the energizing ring to provide a new location for the seal point.

In a specific embodiment, the packing assembly also includes a lantern ring which abuts an adapter ring and a wiper ring that radially seals against the lantern ring.

In another specific embodiment, one or more spacer rings are included in the packing assembly. In some specific embodiments, the spacer rings are packed together abutting the energizing ring. In other specific embodiments, the spacer rings sandwich the energizing ring and the seal rings.

The rings may be formed of different materials including but not limited to elastic polymers and metals. In some specific embodiments, the energizing ring, the seal rings, and the wiper seal are formed of an elastic polymer material, and wherein the at least adapter rings and the lantern ring are formed of metal.

In some specific embodiments, the rings are those typically used in a hydraulic fracturing operation: the spacer rings are junk rings, the energizing ring is a header ring, and the seal rings are pressure rings.

In a second aspect, a method is presented herein. The method comprises providing one or more adapter rings, providing an energizing ring wherein the energizing ring includes an energizing seating surface having a curved cross-section. The method further includes providing at least one seal ring, wherein the at least one seal ring includes a concave receiving surface having a curved cross-section and a convex seating surface. The method also includes seating the energizing ring onto the at least one seal ring which has the curved cross-section and seating the remaining seal rings onto the seated seal ring, wherein the energizing ring and the at least one seal ring form a soft set. The method includes seating the one or more adapter rings on either side of the soft set, and upon determining a worn out surface at the seal point, rearranging a combination of the one or more adapter rings and the at least one seal ring, wherein the rearrangement moves the seal point.

In a specific method embodiment, the energizing ring includes a rib extending from the seating surface, and one seal ring also includes an expansion groove in the concave receiving surface that is configured to receive the rib of the energizing ring. The method further comprises inserting the rib extending from the energizing seating surface of the energizing ring into the expansion groove of seal ring thereby expanding the seal ring to providing a new seal point and the method also includes providing a lantern ring to abut against one of the adapter rings, and providing a wiper seal which radially seals against the lantern ring.

According to some embodiments, the method includes using two spacer rings to abut the energizing ring. In other specific embodiments, the method includes using two spacer rings to sandwich the energizing ring and the seal rings. In some embodiments, one of the spacer rings is also an adapter ring. In other embodiments, the spacer rings are formed of a first metal and the energizing ring, the seal rings, and the wiper seal are formed of an elastic polymer material, and the adapter rings and the lantern ring are formed of a second metal.

In some embodiments, the rings are those typically used in a hydraulic fracturing operation: the spacer rings are junk rings, the energizing ring is a header ring, and the seal rings are pressure rings.

According to a third aspect, there is provided a pump having a movable seal point within a plunger barrel. The pump includes a fluid end for receiving and discharging a fluid, a power end, and one or more plunger barrels extending between the fluid end and the power end, the plunger barrels each housing a plunger capable of traveling within the plunger barrel during operation of the reciprocating pump, and a packing assembly disposed around the plunger between the plunger and the plunger barrel so as to create a seal point between the plunger and the plunger barrel. The packing assembly includes at least one seal ring, at least one adapter ring, and at least one energizing ring; the at least one seal ring being capable of being placed in the packing assembly in a different order with respect to the energizing ring and the at least one adapter ring so that the seal point may be moved.

According to one embodiment, the packing assembly also includes a lantern ring, a wiper ring, and at least one spacer ring.

In yet another embodiment, the rings are designed to be used in a hydraulic fracturing operation: the spacer rings are junk rings, the energizing ring is a header ring, and the seal rings are pressure rings.

According to some embodiments, the pump is a reciprocating pump.

According to other embodiments, the pump is a linear pump.

BRIEF DESCRIPTION OF THE DRAWINGS

The accompanying drawings facilitate an understanding of the various embodiments.

FIGS. 6A and 6B are examples of a packing assembly with sealing point moved per maintenance for sealing one or more moving components of the pumps of FIG. 1.

Like reference numerals indicate like elements.

DETAILED DESCRIPTION

Pump assemblies typically include one or more internal seals that are subject to wear over time. The internal seals may be provided as a packing assembly that includes two or more components stacked together to provide a seal point against a cylinder, plunger, or similar moving components. Due to the constant mechanical stress on the seal components, the seal components in a pump wear out at a much faster rate than other pump components. For example, while a pump assembly as a whole may last for 2000 hours or more, the life span of the seals components in a conventional packing assembly may be about 150 work hours. According to embodiments disclosed herein, the functional life of the seal components may be extended by rearranging their order within the packing assembly, thereby shifting the location of the seal point with respect to the other components of the pump. Accordingly, a fresh seal point is provided without requiring replacement of any of the packing assembly components, thereby increasing the lifespan of the packing assembly two-fold or more, and also increasing the useful life of the fluid end.

This figures in this disclosure illustrate the nature of the invention using a reciprocating pump. However, it is contemplated that this invention is applicable to any pump that utilizes a packing assembly-type seal such as, but not limited to, rotary pumps, linear pumps, progressive cavity pumps, or other types of pumps.

Figure 1:
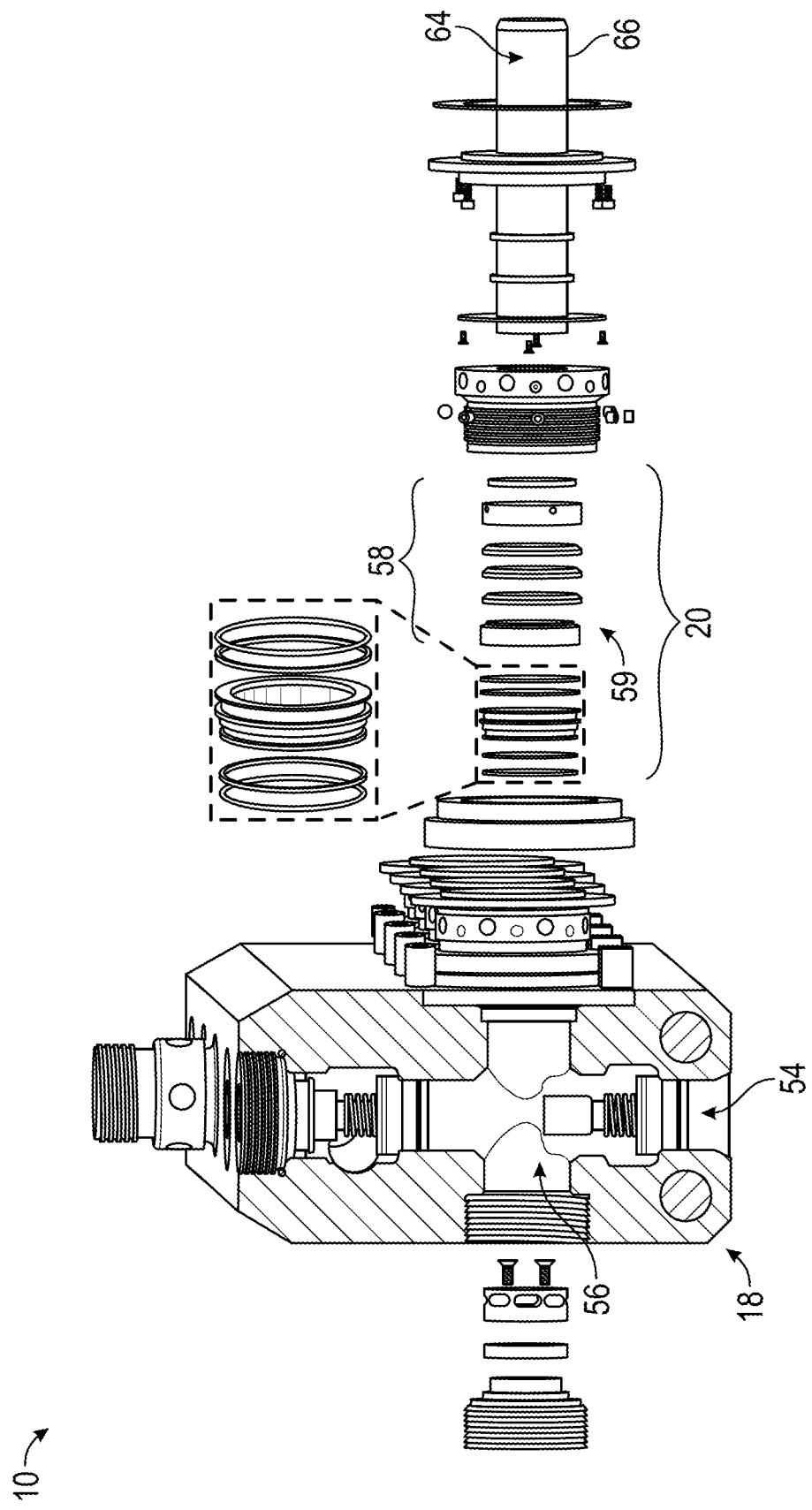
FIG. 1 is an exploded view of a fluid end of a pump according to an embodiment of the current disclosure.

FIG. 1 is an embodiment of an exploded view of a fluid end of a reciprocating pump assembly 10. The fluid end includes a fluid cylinder 18, which provides a pressure chamber including a vertical bore 54 and a cross bore 56. The cross bore 56 is connected to a plunger 64 having an outer surface 66 in contact with a fluid end seal 20. In the embodiment illustrated in FIG. 1, the fluid end seal includes a packing assembly 58 comprising a plurality of rings 59. In some embodiments, each of the rings 59 may have different structural features that contribute to producing the seal effect at the seal point, as discussed in greater detail below, such as for example, in FIG. 6. The rings 59 may be made of varying materials, including metals or elastic polymers such as rubber, for example, as discussed in greater detail below.

Figure 2:
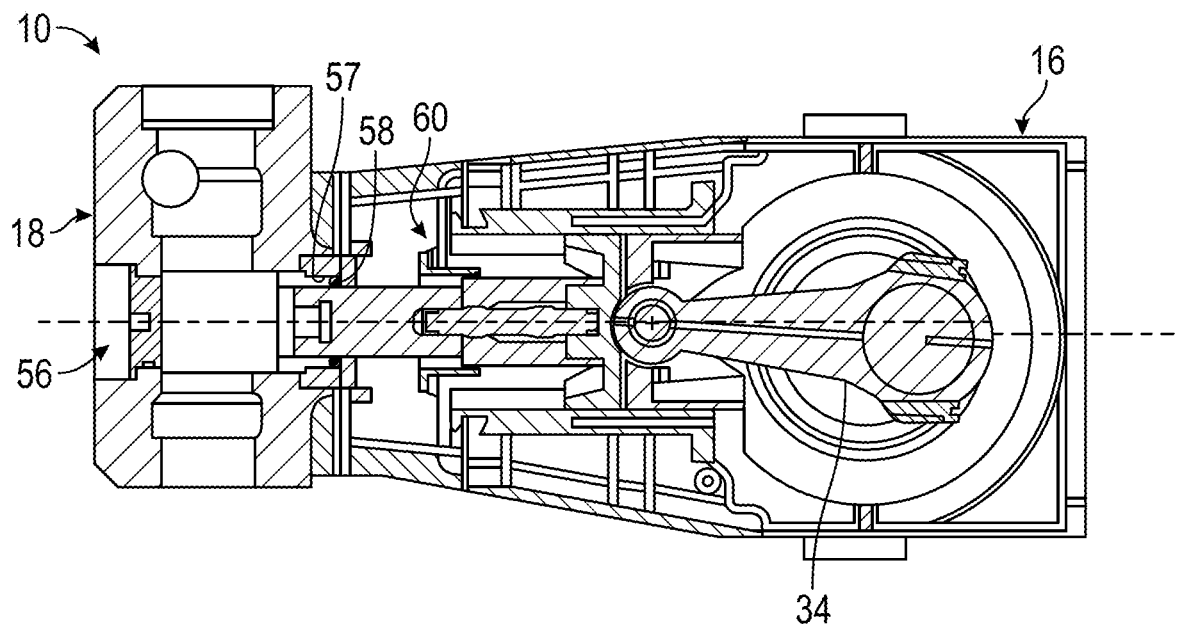
FIG. 2 is a cross sectional side view of the pump including a power end as referred to in FIG. 1, in a fully retracted or bottom dead center position.
Figure 3:
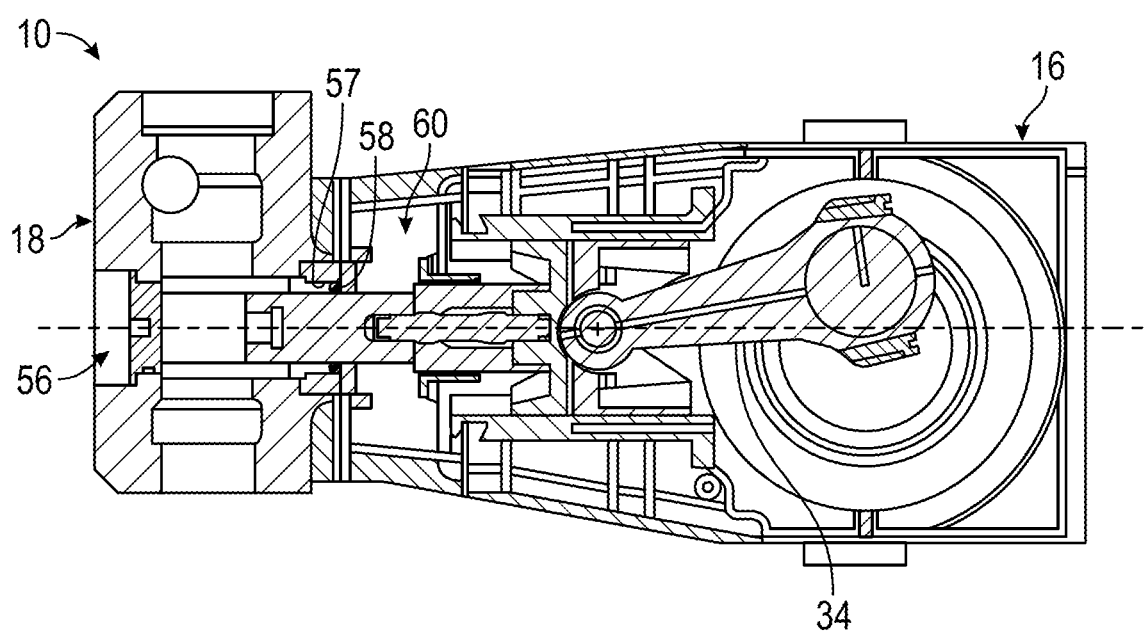
FIG. 3 is a cross sectional side view of the pump assembly of FIG. 2 in a mid-cycle position.
Figure 4:
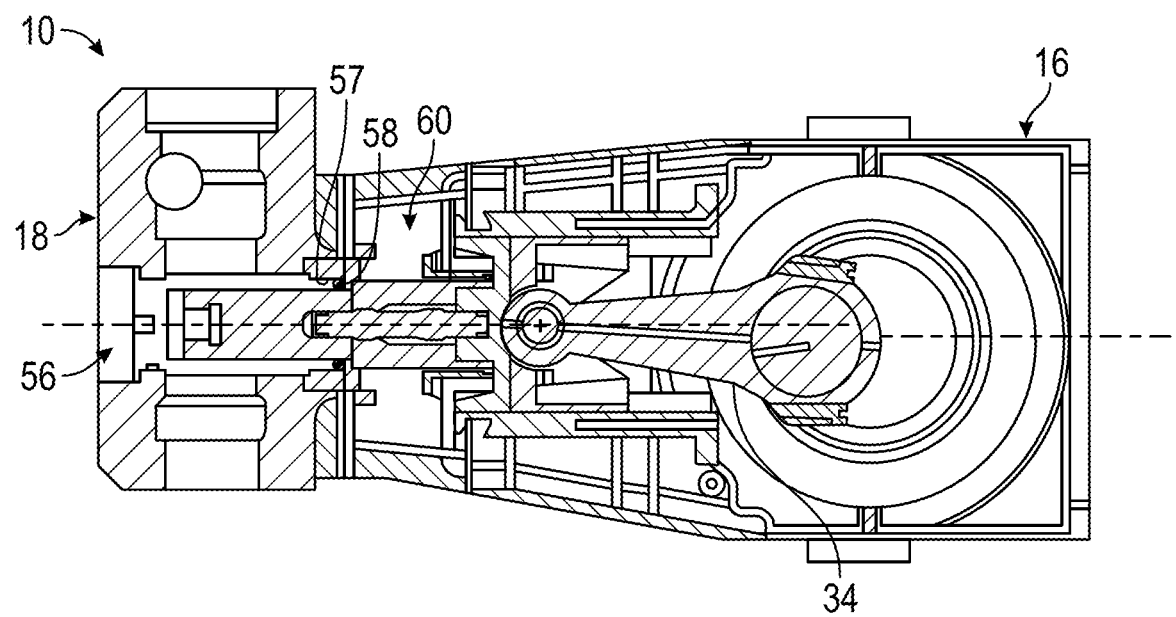
FIG. 4 is a cross sectional side view of the pump assembly of FIG. 2 in a fully extended or top dead position

In FIGS. 2-4, a reciprocating pump assembly 10 is shown in which a movable packing assembly 58 is employed to advantage. Referring specifically to FIGS. 2-4, the pump assembly 10 includes a power end housing 16 coupled to the fluid cylinder 18. The pump assembly 10 includes a plunger assembly 60, which is indirectly connected by a connecting rod 34 to a crankshaft 26 rotatably mounted within the power end housing 16. As the crankshaft 26 is rotated, the plunger assembly 60 moves between a fully retracted or bottom dead center position (FIG. 2), a mid-cycle position (FIG. 3), and a fully extended or top dead position (FIG. 4), thereby applying pressure or suction to the media (not shown) within the fluid end of the pump.

To prevent contamination of the power end by fluid end media, a fluid end seal 20 comprising a movable packing assembly 58 is disposed generally adjacent to an entrance to the cross bore 56 of the fluid cylinder 18. In the embodiment illustrated in FIG. 2, the packing assembly 58 is positioned within the cross bore 56 to form a fluid seal between the inner surface 57 of the fluid cylinder 18 and the outer surface 66 of the plunger 64.

Figure 5A:
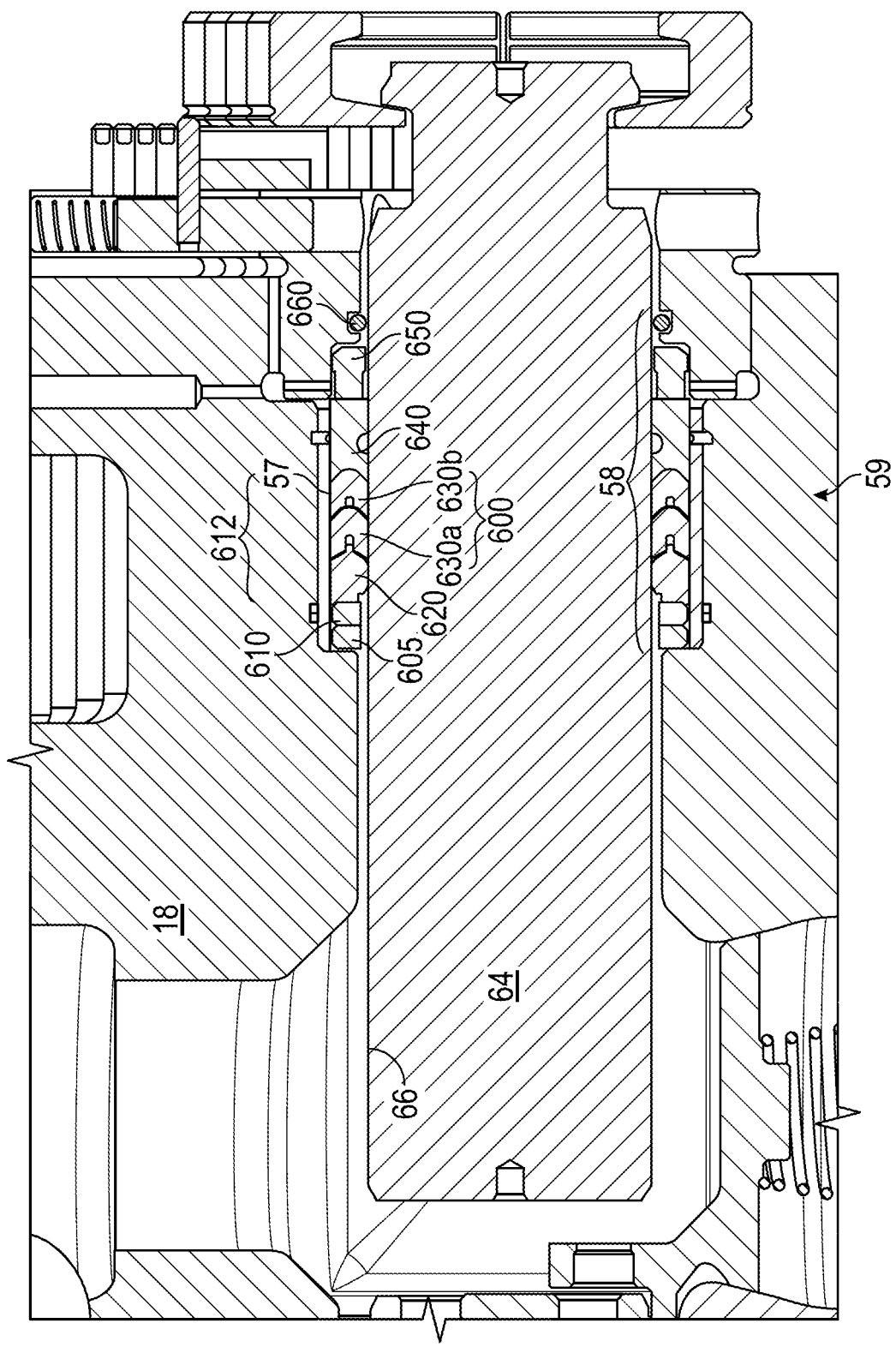
FIGS. 5A and 5B are an enlarged view of a portion of the pump assembly of FIGS. 2-4.
Figure 5B:
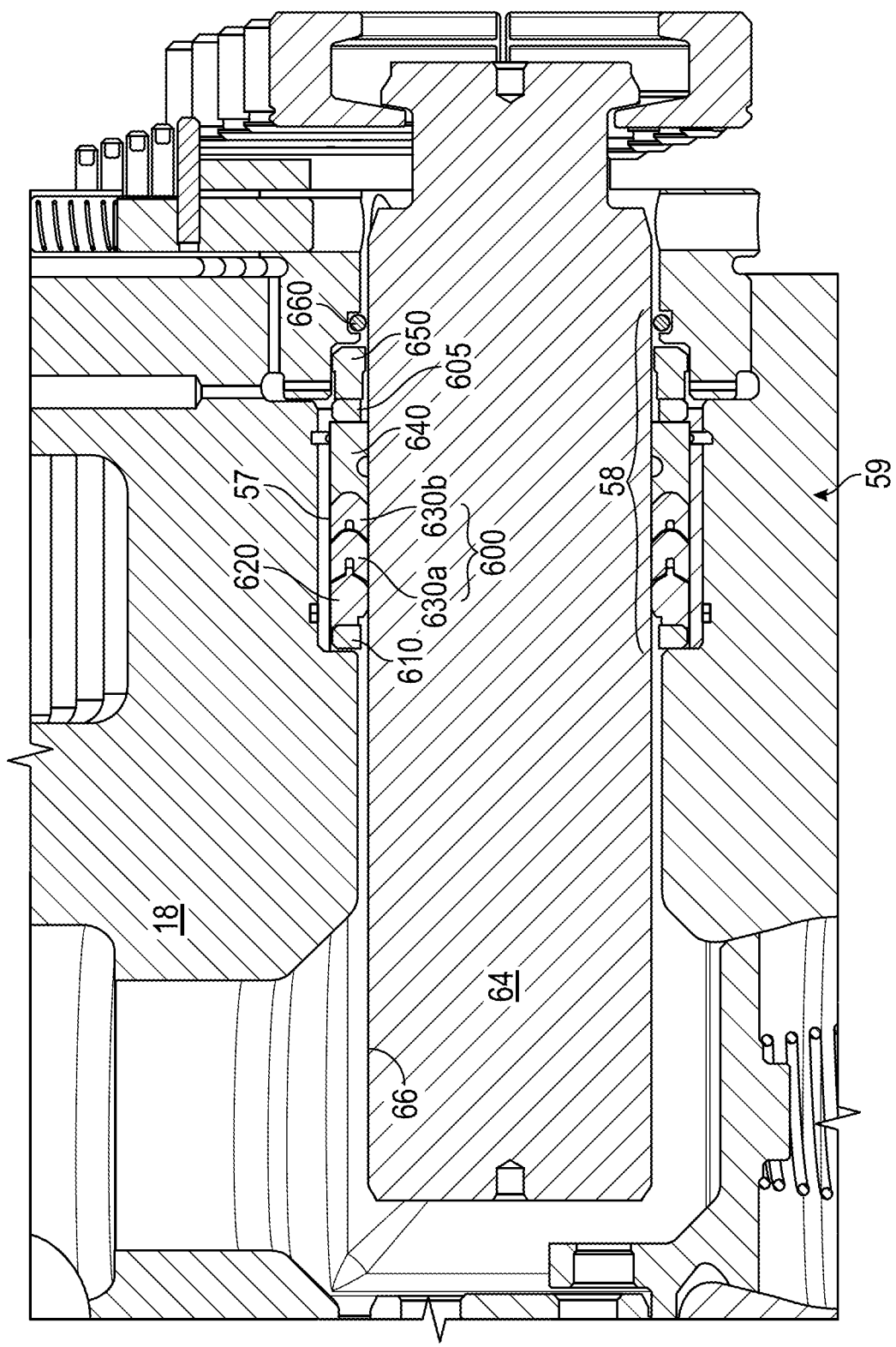

FIGS. 5A and 5B illustrate a side view of an embodiment of the packing assembly 58 for sealing one or more moving components of the pump of FIG. 1. As shown, the packing assembly 58 includes a first adapter ring 605, a spacer ring 610, an energizing ring 620, two or more seal rings 630a and 630b, a second adapter ring 640, a lantern ring 650, and a wiper seal 660. In the embodiment illustrated in FIGS. 5A and 5B, the energizing ring 620 and the two or more seal rings 630a and 630b together are referred to as a soft bed 612. A first order for the rings 59 comprising the packing assembly 58 are shown in FIG. 5A. As shown in FIG. 5B, during maintenance, the first adapter ring 605 may be repositioned in between the second adapter ring 640 and the lantern ring 650. Repositioning the rings in this way establishes a new seal point 600 located closer to the power end of the pump. In this way, a new seal can be established without replacing the components of the packing assembly 58.

FIGS. 6A and 6B illustrate the embodiment when the packing assembly 58 comprises a first adapter ring 605, a spacer ring 610, an energizing ring 620, a seal ring 630, a second adapter ring 635, a third adapter ring 640, a lantern ring 650, and a wiper seal 660. In FIG. 6A, the soft bed 612 is positioned between the spacer ring 610 and the second adapter ring 640. FIG. 7B illustrates an embodiment when the first adapter ring 605 is moved between the soft bed 612 and the third adapter ring 640, moving the seal point toward the fluid end as compared to the embodiment shown in FIG. 6A. Alternatively, starting with the ring arrangement illustrated in FIG. 6A, additional adapter rings may be positioned before the spacer ring to move the seal point toward the power end (not illustrated).

In the embodiments illustrated in FIGS. 6A and 6B, the seal ring 630 and the second adapter ring 635 include respective concave receiving surfaces 722a and 722b having a curved cross-section. The seal ring 630 is formed having a complimentary convex seating surface 724a. The convex seating surface 724a has a curved cross-section such that the seal ring 630 may be seatable and otherwise nestable onto the second adapter ring 635. The seal ring 630 further includes an expansion groove 720 in the concave receiving surface 722a. The expansion groove is configured to receive a rib 730 of the energizing ring 620 in order to expand radially to form a seal point, as explained below.

In the embodiment show in FIGS. 6A and 6B, the energizing ring 620 includes an energizing seating surface 732 that has a curved cross-section such that the energizing seating surface 732 is seatable onto the seating surface 724a of the seal ring 630. The rib 730 extends from the energizing seating surface 732 and may be inserted into the expansion groove 720 of the seal ring 630 against which it is seated. The rib 730 may have a thickness slightly greater than the aperture of the expansion groove 720 such that when the rib 730 is inserted, the seal ring 630 is expanded radially to engage the outer surface of the plunger 66 and the inner surface of the fluid cylinder 18 to create a seal point.

This disclosure is not limited to only the type of seal ring 630 shown in the illustrations; other types of seal rings may also be used in the packing assembly 58. For example, in some embodiments, the receiving surface 722a of the seal ring 630 has an overall concave cross-section composed of a series of flat surfaces rather than a continuous curved surface. In some embodiments, the cross section profile of the receiving surface 722a of the seal ring 630 has a chevron shape. In some embodiments, the seating surface 724a of the seal ring 630 has an overall convex cross-section but is composed of a series of flat surfaces rather than a continuous curved surface. In some embodiments, the cross section profile of the seating surface 724a of the seal ring 630 has a chevron shape. In some embodiments, the profile shape of the seal ring 630 forms interlocking channels that cause the rings to expand radially when multiple seal rings 630 are fitted together as in the embodiments illustrated in FIGS. 7A-7F.

As illustrated in FIGS. 7A-7F, in some embodiments there are two seal rings 630a and 630b. In other embodiments there are three seal rings 630a and 630b. Other embodiments have four seal rings 630a and 630b. Still other embodiments have more than four seal rings 630a and 630b.

In some embodiments, such as the one illustrated in FIGS. 7A-7F, the two or more seal rings 630a and 630b are identical in shape to each other. In other embodiments, the two or more seal rings 630a and 630b have different shapes.

In other embodiments, one of the two or more seal rings 630a and 630b comprises a central ring formed of elastic polymer material. This central ring has an elongated base that is in contact with the inner diameter of the fluid cylinder 18, defining a space between the surface of the base of the central ring and the outer surface 66 of the barrel. In one of these embodiments, at least one additional seal ring formed of polytetrafluoroethylene-based material is inserted into the space defined between the elongated base of the central ring and the outer surface 66 of the barrel, reinforcing the structural integrity of the central ring during operation.

In some embodiments, one of the two or more seal rings 630a and 630b is a cup seal. In some of these embodiments, there is a second energizing ring that is inserted into the one of the two or more seal rings 630a and 630b that is a cup ring, causing the cup ring to expand radially and engage the outer surface of the plunger 66 and the inner surface of the fluid cylinder 18, establishing a seal point.

In other embodiments, the energizing ring 620 is comprised of an inner ring and an outer ring, such that the inner ring contacts the outer surface 66 of the plunger and the outer ring and the outer ring contacts the inner ring and the inner diameter of the fluid cylinder 18. In some of these embodiments, the inner ring is formed of an elastic polymer material and the outer ring is formed of metal. In other embodiments the inner ring is made of metal and the outer ring is formed of elastic polymer material. In other embodiments, the energizing ring is a lip seal.

In some embodiments, a first seal ring 630 of the two or more seal rings 630a and 630b is seated into the inner diameter of a second seal ring, such that the first seal ring contacts the outer surface 66 of the plunger and the second seal ring contacts the inner diameter of the fluid cylinder 18. In some of these embodiments, the first seal ring 630 is formed of a polytetrafluoroethylene-based material and the second seal ring is formed of an elastic polymer material. In some embodiments, the first seal ring 630 has a rectangular cross section and the second seal ring has a round cross section.

During operation, the materials providing the seal at the seal point 600 will wear as the number of operation cycles increases. When the wear compromises the sealing effect, the positions of the seal rings 630a and 630b may be moved relative to the other components of the packing assembly such that the energizing ring 620 engages the unworn seal ring to create a seal at a new seal point. For example, the two or more seal rings 630a and 630b are packed together in different orders relative to the energizing ring 620 when a current one of the two or more seal rings 630a and 630b becomes worn out at the seal point 600. When the rings 59 are rearranged, a new location of the seal point 600 may be provided, substantially extending the total useable life of the packing assembly 58.

In some embodiments, three or more seal rings 630 may be used in the packing assembly 58, thereby further extending the life of the packing assembly 58. In such arrangement, the seal point 600 may be refreshed two times without initiating a need to replacing the packing assembly 58. In some embodiments, such as the one shown in FIGS. 6A and 6B, additional components, such as one or more spacer rings 610, may be included in the packing assembly 58 to enable further rearrangement of new seal point 600 locations. For example, in FIGS. 6A and 6B, a spacer ring 610 is shown abutting an end surface of the energizing ring 620. The inclusion of the spacer ring 610 moves the longitudinal position of the seal point created by the seal ring 630. This is further illustrated in FIGS. 7A and 7B.

FIGS. 7A-7F illustrate exploded side views of six other embodiments of the packing assembly 58 of FIGS. 5A and 5B. In the embodiments illustrated in FIGS. 7A-7F, additional spacer rings 810, 812, 820, 830, and 840 are included in the packing assembly 58. These additional spacer rings 810, 812, 820, 830, and 840 may be recombined and reordered to move the seal point 600 created in the soft bed 612 relative to the fluid cylinder 18.

Figure 7A:
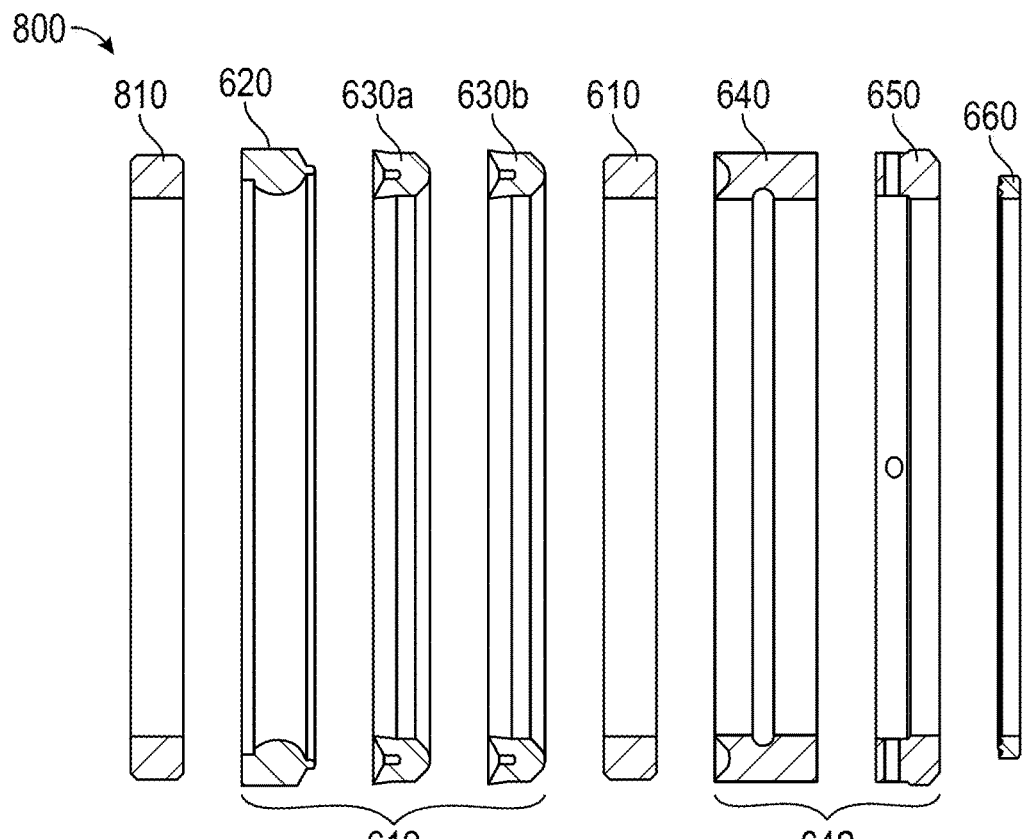
FIGS. 7A through 7F are exploded side views of different embodiments of the packing assembly of FIG. 6.
Figure 7B:
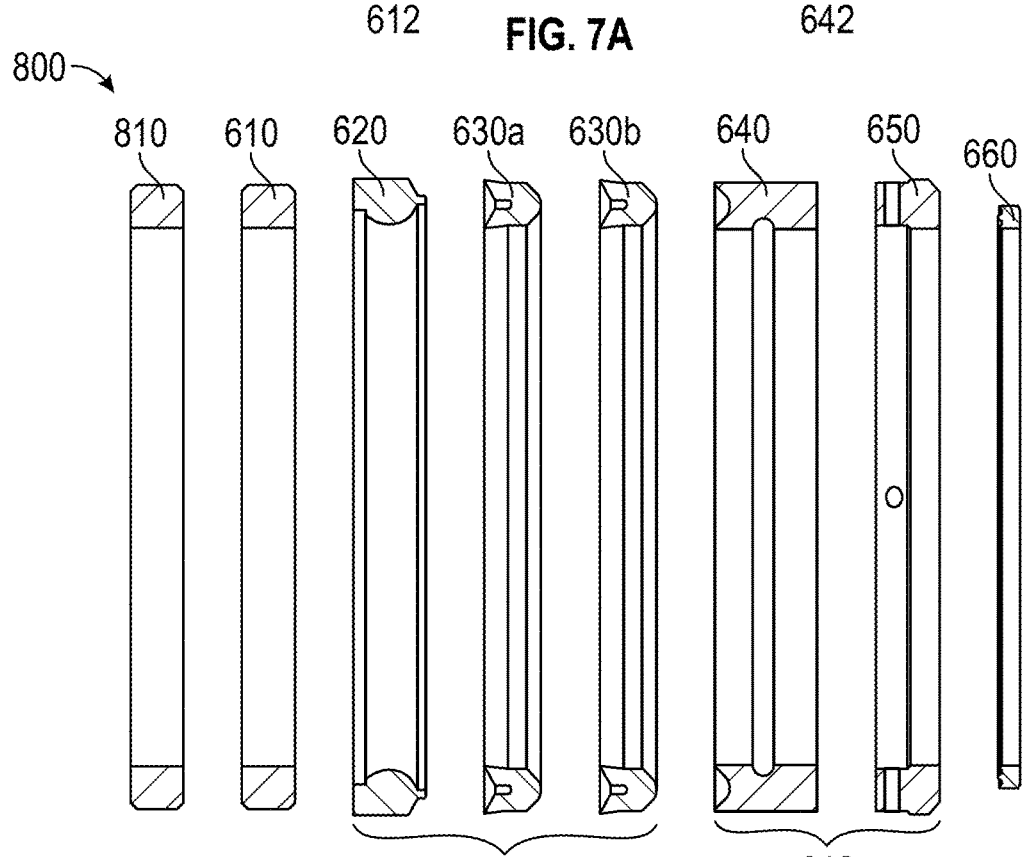
Figure 7C:
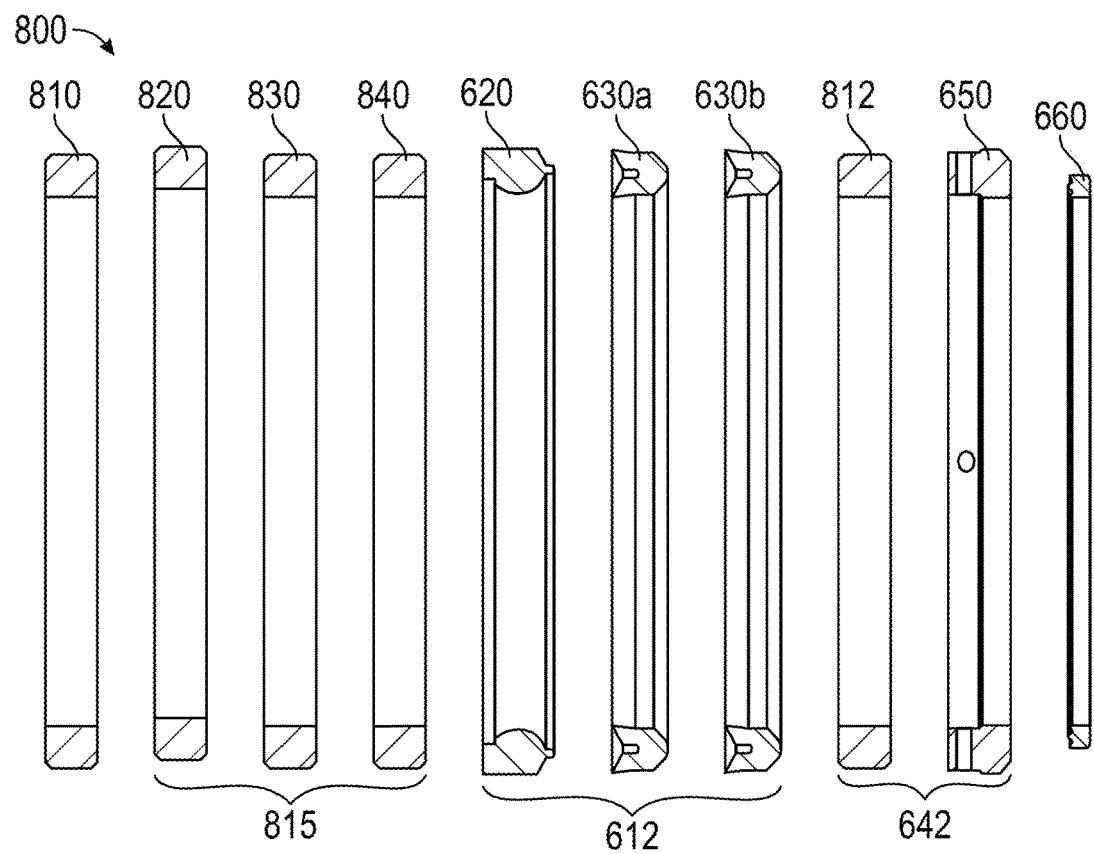

In FIG. 7A, the spacer rings 810 and 610 are stacked on the same side with respect to the energizing ring 620. In FIG. 7B, the seal rings 630a and 630b exchange positions and the spacer ring 810 is positioned in between the seal ring 630a and the adapter ring 640. In the configuration of FIG. 7B, the relocation of the spacer ring 610 between the seal ring 630b and the adapter ring 640 moves the seal point created by the energizing ring 620 and the seal rings 630a and 630b toward the spacer ring 810. As such, the new seal point 600 is provided by the seal rings 630a and 630b engaging with fresh portions of the outer surface of the plunger 66 and the inner diameter of the fluid cylinder 18. Other embodiments, such as including additional spacer rings for repositioning the seal point location, may be possible.

For example, although the spacer rings 810 and 610 sandwich the energizing ring 620 and the two or more seal rings 630a and 630b with the spacer ring 610 being in contact with the seal ring 630a, the locations of the two spacer rings 810 and 610 may be switched, such as the spacer ring 810 moved to be in between the seal ring 630a and the adapter ring 640.

Figure 7D:
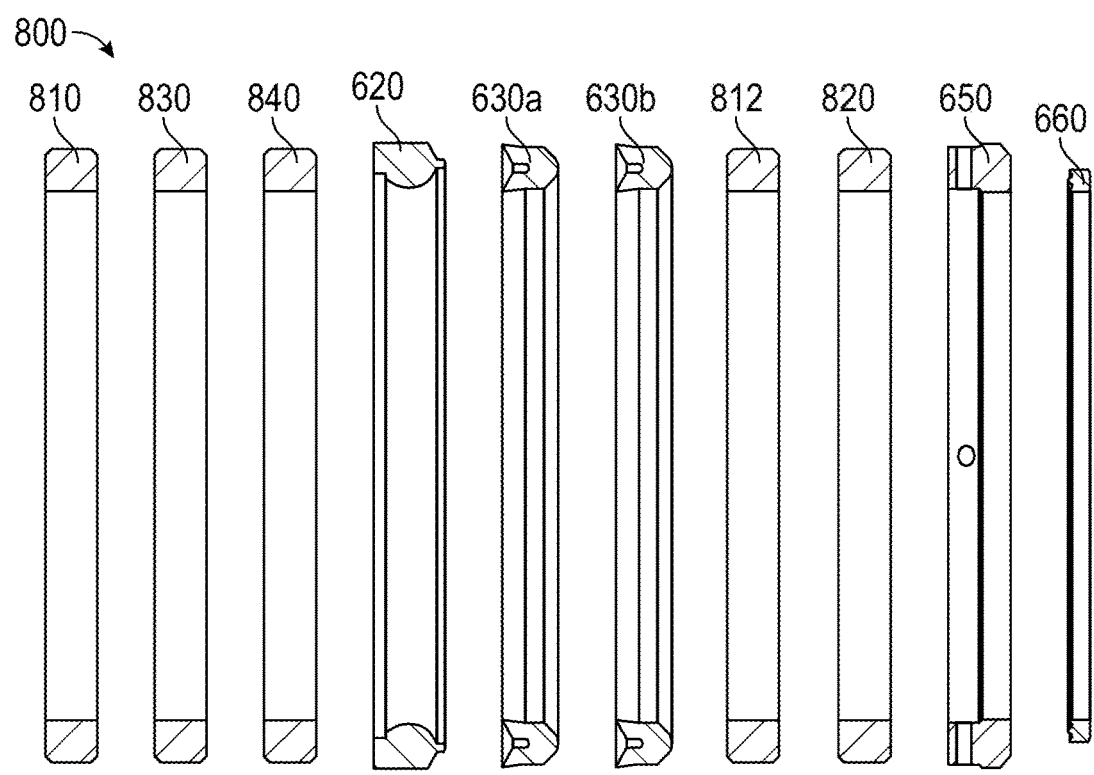
Figure 7E:
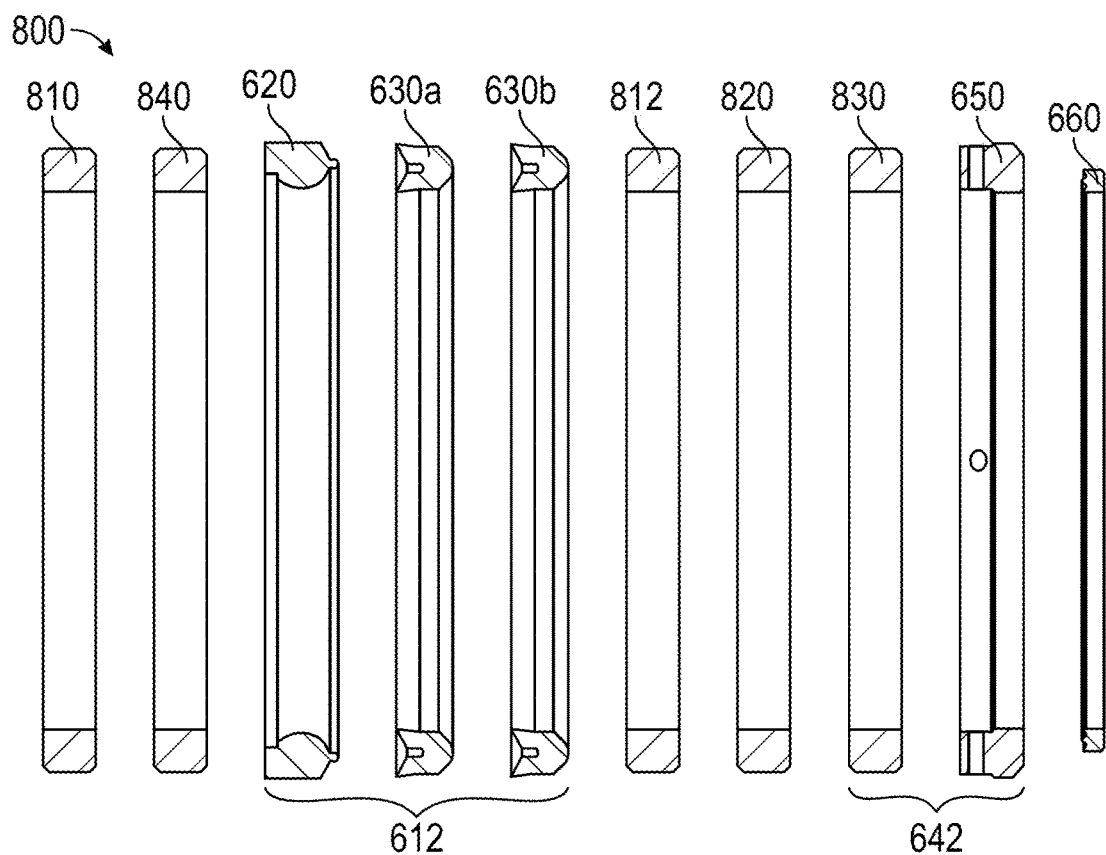
Figure 7F:
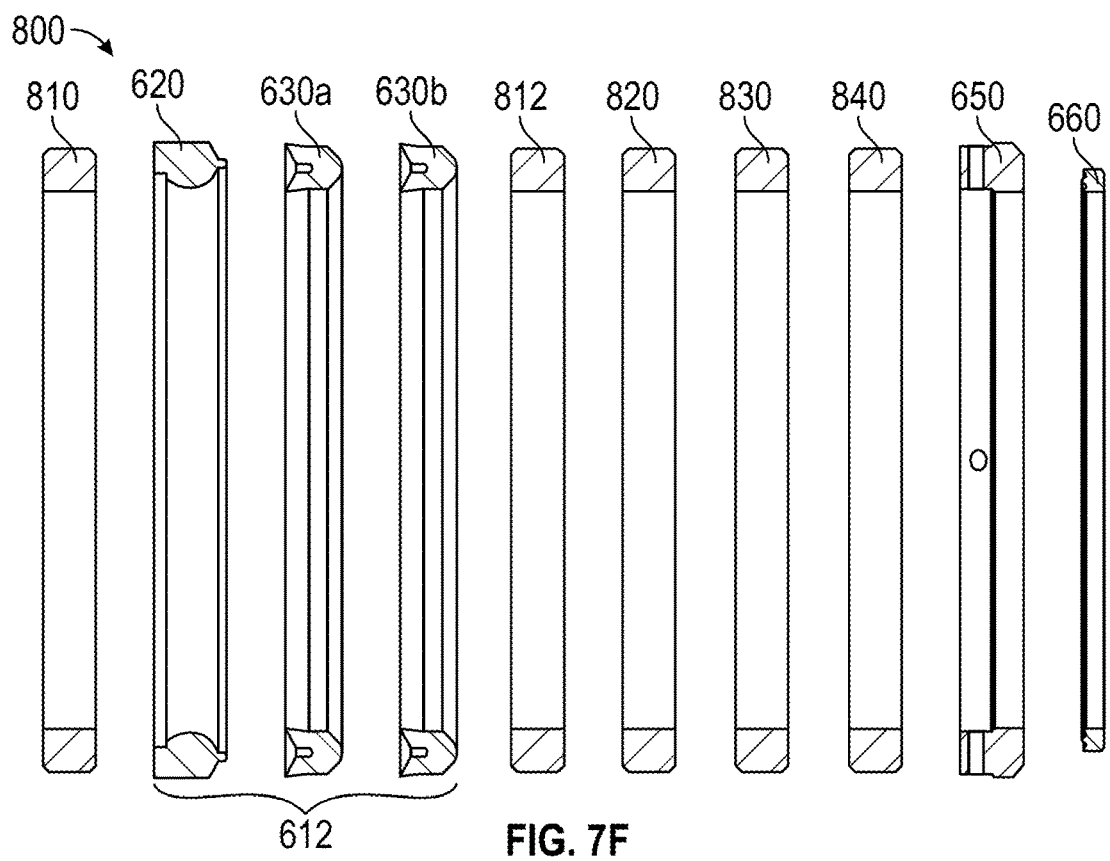

In the embodiment illustrated in FIGS. 7C-7F, four spacer rings 812, 820, 830, and 840 are used to seal and support the soft bed 612 and, by arrangement in different positions, to move the seal point 600 provided by the soft bed 612 to different locations relative to the plunger 64 and fluid cylinder 18. For example, in FIG. 7C, the spacer rings 820, 830, and 840 are all to the left of the soft bed 612. In FIGS. 7D, 7E, and 7F, the spacer rings 820, 830, and 840 are moved to the right of the soft bed 612 one by one, in each respective figure. In this way, the seal point provided by the soft bed 612 is moved toward the fluid end housing (toward the left in the figures). Although four spacer rings 812, 820, 830, and 840, as well as one spacer ring 810 has been illustrated, different numbers and thicknesses of these adapter rings and spacer ring(s) may be used to provide different level of adjustments of the seal point.

The components of the packing assembly 58, namely the spacer ring 610, the energizing ring 620, seal rings 630, the lantern ring 650, the adapter ring 640, and the wiper seal 660 can be formed of many types of materials. For example, in some embodiments, packing assembly 58 components are formed of a polytetrafluoroethylene-based (PTFE) material. In other embodiments, the packing assembly 58 components are formed of a polyether ether ketone-based (PEEK) material. In still other embodiments, the packing assembly 58 components are formed of an elastic polymer material such as, but not limited to, rubber. However, it should be understood that other materials may be utilized depending on the particular application.

In alternative embodiments, the packing assembly 58 components may be formed of metal such as, but not limited to, copper, aluminum, silver, gold, indium, lead, tin, nickel, tungsten, molybdenum, iron, or other metals. In other embodiments, the packing assembly 58 components are formed of an alloy of metal such as, but not limited to, nickel-copper alloys, carbon steels, stainless steels, chromium steels, high-nickel chromium steels, nickel-chromium alloys, nickel-molybdenum-chromium alloys, nickel-chromium-cobalt alloys, cobalt-chromium-nickel alloys, cobalt-nickel-chromium-tungsten alloys, nickel-chromium-tungsten-molybdenum alloys, nickel-chromium-aluminum-iron alloys, nickel-chromium-cobalt alloys, depending on the temperature, pressure, chemical resistance, and oxidation or reduction resistance demands of the sealing environment.

In some embodiments, the packing assembly 58 components are each formed of the same material. In other embodiments, some of the packing assembly 58 components are formed of different materials with respect to the others. For example, in one embodiment the seal rings 630 and the wiper seal 660 are both formed of rubber while the spacer ring 610, the energizing ring 620, the lantern ring 650, and the adapter ring 640 are formed of aluminum.

In some embodiments, to provide additional chemical, oxidation, or reduction resistance, the packing assembly 58 components may be coated with materials such as, but not limited to, gold, silver, PTFE, copper, lead, indium, nickel, or aluminum.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the disclosure(s), and alterations, modifications, additions and/or changes can be made thereto without departing from the scope and spirit of the disclosed embodiments, the embodiments being illustrative and not restrictive.

Furthermore, disclosures herein have been described in connection with what are presently considered to be the most practical and preferred embodiments and it is to be understood that the disclosure is not to be limited to the specifically disclosed embodiments, but on the contrary, is intended to cover various modifications and equivalent arrangements included within the spirit and scope of the disclosure(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A packing assembly providing a seal point configurable at multiple locations relative to an end of the packing assembly, the packing assembly comprising:
   a soft bed including at least one energizing ring and at least one seal ring;
   a spacer ring sealable with the at least one energizing ring; and
   at least one adapter ring,
   wherein the packing assembly is configured to be provided in a first order and a second order such that the first order and the second order provide two different seal point locations relative to the end of the packing assembly, and
   wherein the first order comprises the adapter ring and the spacer ring on a first side of the soft bed, and the second order comprises the spacer ring on the first side of the soft bed and the adapter ring on a second side of the soft bed.

2. The packing assembly of claim 1, wherein the at least one seal ring comprises two or more seal rings and each of the two or more seal rings further comprise:
   a concave receiving surface and
   a convex seating surface, the convex seating surface of a first seal ring of the two or more seal rings is seated into the concave receiving surface of a second seal ring of the two or more seal rings; and
   an expansion groove in the concave receiving surface, the expansion groove positioned to receive a rib of the energizing ring.

3. The packing assembly of claim 2, wherein the energizing ring further includes an energizing seating surface having a curved cross-section and seatable onto the concave seating surface of one of the two or more seal rings, and wherein the rib extends from the energizing seating surface and is insertable into the expansion groove of the one of the two or more seal rings causing the energizing ring to expand the one of the two or more seal rings in a radial direction for providing the seal point.

4. The packing assembly of claim 1, wherein a first seal ring of the at least one seal ring further comprises an inner perimeter and an outer perimeter, and further comprises a raised edge on the outer perimeter and on the inner perimeter of the first seal ring forming a channel.

5. The packing assembly of claim 4, wherein a first energizing ring of the at least one energizing ring is seated into the channel of the first seal ring of the at least one seal ring thereby radially expanding the first seal ring in which the first energizing ring is seated.

6. The packing assembly of claim 1, wherein the at least one seal ring comprises two or more seal rings and a first seal ring of the two or more seal rings is seated radially onto a second seal ring of the two or more seal rings, and the first seal ring is formed of a different material than the second seal ring.

7. The packing assembly of claim 1, wherein the at least one seal ring comprises two or more seal rings and a first seal ring of the two or more seal rings has a convex cross-section and a second seal ring of the two or more seal rings is seated onto the first seal ring, the first and second seal rings being formed of different materials.

8. The packing assembly of claim 1, wherein the at least one seal ring comprises two or more seal rings and wherein the two or more seal rings are configured to be packed together in the first order and in the second order relative to the at least one energizing ring, such that when a current one of the two or more seal rings becomes worn out at the seal point while the two or more seal rings are packed in the first order, the two or more seal rings provide a new location for the seal point when packed in the second order.

9. The packing assembly of claim 1, further comprising:
a lantern ring;
and a wiper seal radially sealing against the lantern ring,
wherein the first order comprises the adapter ring and the spacer ring on the first side of the soft bed and the lantern ring and the wiper seal on the second side of the soft bed, and the second order comprises the spacer ring on the first side of the soft bed and the adapter ring, the lantern ring, and the wiper seal on the second side of the soft bed.

10. The packing assembly of claim 9, wherein the spacer ring is a first spacer ring and further comprising a second spacer ring.

11. The packing assembly of claim 10, wherein the first and the second spacer rings are packed together abutting the energizing ring.

12. The packing assembly of claim 10, wherein the first spacer ring abuts the energizing ring and the second spacer ring abuts the at least one seal ring.

13. The packing assembly of claim 10, wherein the first spacer ring and the second spacer ring are formed of metal; wherein the energizing ring, the at least one seal ring, and the wiper seal are formed of an elastic polymer material; and wherein the at least one adapter ring and the lantern ring are formed of metal.

14. The packing assembly of claim 10, wherein the first spacer ring is a junk ring, the second spacer ring is a junk ring, the energizing ring is a header ring, and the at least one seal ring is a pressure ring as used in a reciprocating pump in a hydraulic fracturing operation.

* * * * *